(12) United States Patent
Davies

(10) Patent No.: US 8,183,870 B1
(45) Date of Patent: May 22, 2012

(54) BATTERY SYSTEM AND METHOD FOR SENSING AND BALANCING THE CHARGE STATE OF BATTERY CELLS

(75) Inventor: Francis J. Davies, Friendswood, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 504 days.

(21) Appl. No.: 12/370,021

(22) Filed: Feb. 12, 2009

(51) Int. Cl.
*G01N 27/416* (2006.01)
*H02J 7/00* (2006.01)
*G05F 1/12* (2006.01)
*H02H 3/00* (2006.01)

(52) U.S. Cl. ........ 324/434; 320/118; 320/119; 320/120; 320/121; 320/122; 323/247; 323/248; 323/249; 323/250; 323/251; 361/78; 361/79; 361/86; 361/87; 361/88

(58) Field of Classification Search .................. 324/434; 323/249; 320/118
See application file for complete search history.

(56) References Cited

U.S. PATENT DOCUMENTS

| 5,623,171 | A | * | 4/1997 | Nakajima | 307/106 |
|---|---|---|---|---|---|
| 5,666,040 | A | | 9/1997 | Bourbeau | |
| 5,914,606 | A | | 6/1999 | Becker-Irvin | |
| 5,923,148 | A | | 7/1999 | Sideris et al. | |
| 5,982,143 | A | | 11/1999 | Stuart | |
| 6,031,354 | A | | 2/2000 | Wiley et al. | |
| 6,181,103 | B1 | | 1/2001 | Chen | |
| 6,268,711 | B1 | | 7/2001 | Bearfield | |
| 6,369,525 | B1 | * | 4/2002 | Chang et al. | 315/300 |
| 6,583,603 | B1 | | 6/2003 | Baldwin | |
| 6,664,762 | B2 | | 12/2003 | Kutkut | |
| 6,803,678 | B2 | | 10/2004 | Gottlieb et al. | |
| 6,844,703 | B2 | * | 1/2005 | Canter | 320/131 |
| 6,983,212 | B2 | | 1/2006 | Burns | |
| 7,081,737 | B2 | | 7/2006 | Liu et al. | |
| 7,148,654 | B2 | | 12/2006 | Burany et al. | |
| 2003/0141843 | A1 | * | 7/2003 | Anzawa et al. | 320/118 |
| 2007/0279003 | A1 | * | 12/2007 | Altemose et al. | 320/118 |
| 2009/0108805 | A1 | * | 4/2009 | Liu et al. | 320/108 |
| 2010/0283433 | A1 | * | 11/2010 | Oh et al. | 320/162 |

* cited by examiner

*Primary Examiner* — Patrick Assouad
*Assistant Examiner* — Nathaniel Pelton
(74) *Attorney, Agent, or Firm* — Theodore U. Ro

(57) ABSTRACT

A battery system utilizes a plurality of transformers interconnected with the battery cells. The transformers each have at least one transformer core operable for magnetization in at least a first magnetic state with a magnetic flux in a first direction and a second magnetic state with a magnetic flux in a second direction. The transformer cores retain the first magnetic state and the second magnetic state without current flow through said plurality of transformers. Circuitry is utilized for switching a selected transformer core between the first and second magnetic states to sense voltage and/or balance particular cells or particular banks of cells.

11 Claims, 10 Drawing Sheets

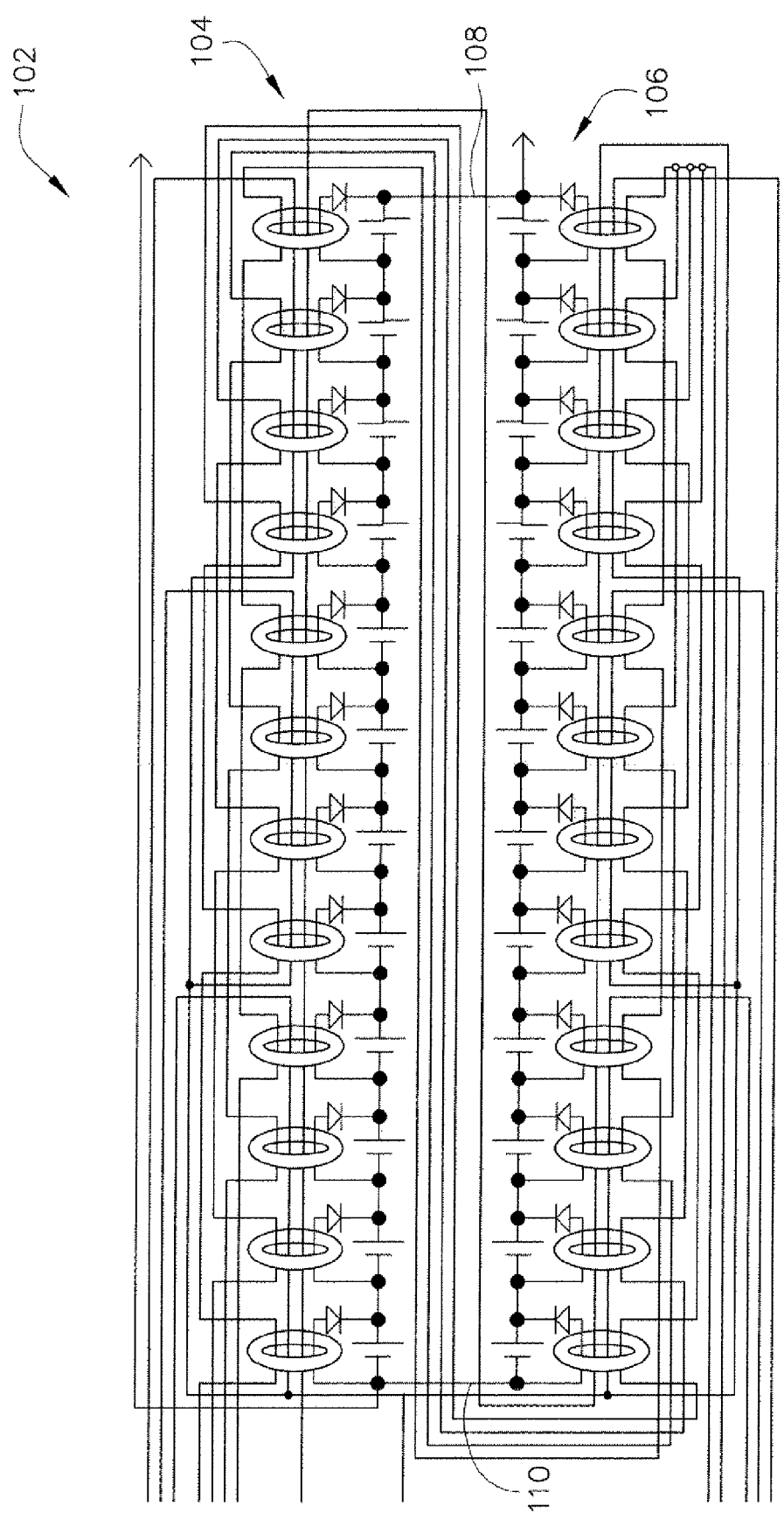

BATTERY SYSTEM AND METHOD FOR SENSING AND BALANCING THE CHARGE STATE OF BATTERY CELLS

ORIGIN OF THE INVENTION

The invention described herein was made by employee(s) of the United States Government and may be manufactured and used by or for the Government of the United States of America for governmental purposes without the payment of any royalties thereon or therefore.

BACKGROUND OF THE INVENTION

1. Field of the Invention

The present invention relates generally to battery cell monitoring and/or balancing. In one possible embodiment, the present invention relates to using saturated transformer cores in a matrix arrangement to address individual battery cells or groups of battery cells.

2. Description of Related Art

High voltage batteries may involve connections of many cells or cell modules. Examples of high voltage batteries include battery cell arrays for hybrid cars, aerospace/spacecraft applications, telecommunication power supplies, computer power supplies, uninterruptible power supplies, electric utility energy storage, commercial applications, and the like. High voltage batteries may be of different types including lithium-ion cells, fuel cells, other electrochemical cells, and the like.

In prior art systems, some of which are discussed hereinafter, cell monitoring and balancing are achieved either by including complex electronic circuitry at each cell, or electrical connectors with many contacts to allow external circuitry to monitor and balance the cells. Complicated circuitry at each cell is inherently less reliable. If many connections are required, the connectors present electrical shock safety issues. If the connectors are heavy, then they may be unsuitable for aerospace/spacecraft applications.

For some applications, it may be desirable to provide separate battery system components such as an external charger and an external cell charge measurement subsystem. To provide the capability to monitor individual battery cells, a multi-pin connector on the battery is required. In large high voltage batteries, such a connector has several disadvantages. The connector needs at least one pin per cell. Since the battery can produce high voltages, the sense lines need a safety disconnect or electrical isolation to avoid exposing ground personnel or crew to high voltages when the connector is used. Since the battery can produce high currents, the sense lines may also need some sort of fusing or other wire protection as well.

It would be desirable to provide a cell monitoring system with minimal complexity such as the absence of need for fusing on sense lines, electrical isolation for each cell, limited leakage current drains on the cells, and limits to overcharge rates for the individual battery cells.

Batteries may utilize a wide range of the number of individual cells depending on the requirements of the system. For example, batteries may have a few cell, thirty or more cells, over one hundred cells, or more. Thus, the number of connections necessary to provide access to individual cells may be quite large. It would be desirable to keep the number of connections to a minimum. In such batteries, it is often desirable to monitor the cell voltages and balance the state of the charge of the individual cells to improve the battery operation and lifetime.

The following patents show prior art efforts regarding the above and other problems:

U.S. Pat. No. 7,148,654, issued Dec. 12, 2006, to Burany et al, discloses a system and method for monitoring cell voltages for a plurality of electrochemical cells connected in series forming a cell stack. The method includes dividing the cells into at least two cell groups, measuring the voltage across each cell group and estimating the minimum cell voltage for each group based on the average cell stack voltage and an estimated number of deficient cells in each group. The lowest minimum cell voltage for the entire cell stack is then determined.

U.S. Pat. No. 7,081,737, issued Jul. 25, 2006, to Liu et al, discloses a monitoring circuit for monitoring a voltage level from each of a plurality of battery cells of a battery pack includes an analog to digital converter (ADC) and a processor. The ADC is configured to accept an analog voltage signal from each of the plurality of battery cells and convert each analog voltage signal to a digital signal representative of an accurate voltage level of each battery cell. The processor receives such signals and provides a safety alert signal based on at least one of the signals. The ADC resolution may be adjustable. A balancing circuit provides a balancing signal if at least two of the digital signals indicate a voltage difference between two cells is greater than a battery cell balance threshold. An electronic device including such monitoring and balancing circuits is also provided.

U.S. Pat. No. 6,983,212, issued Jan. 3, 2006, to Burns, discloses a battery management system for control of individual cells in a battery string. The battery management system includes a charger, a voltmeter, a selection circuit and a microprocessor. Under control of the microprocessor, the selection circuit connects each cell of the battery string to the charger and voltmeter. Information relating to battery performance is recorded and analyzed. The analysis depends upon the conditions under which the battery is operating. By monitoring the battery performance under different conditions, problems with individual cells can be determined and corrected.

U.S. Pat. No. 6,844,703, issued Jan. 18, 2005, to Canter, discloses a battery cell balancing system for a battery having a plurality of cells. The system includes a power supply and a plurality of transformer/rectifier circuits electrically coupled to the cells. Preferential charging occurs for a cell with the lowest state of charge. At least one current limiting device is electrically coupled to the transformer/rectifier circuits and the power supply. The current limiting device buffers a source voltage from a reflected voltage of at least one of the plurality of cells).

U.S. Pat. No. 6,803,678, issued Oct. 12, 2004, to Gottlieb et al, discloses a UPS system for providing backup power to a load includes: a power input; multiple batteries; multiple battery housings, each containing one of the batteries, the batteries being coupled in parallel; multiple battery-monitor processors, each monitor being disposed in a respective one of the battery housings and coupled to the corresponding battery; a UPS processor coupled, and configured, to receive monitor data from the plurality of battery-monitor processors; a UPS-processor housing containing the UPS processor and being displaced from the battery housings; and a power output coupled and configured to selectively provide power from one of the power input and the batteries.

U.S. Pat. No. 6,664,762 issued Dec. 16, 2003, to Kutkut, discloses a battery charger for charging high voltage battery strings that includes a DC-to-AC converter, which drives the primary of a transformer having multiple secondaries. Each secondary winding has a corresponding output stage formed of a rectification circuit, output inductor, and output capacitor. The output terminals of the output stages are connectable either in parallel or series. In either configuration, inductor current and capacitor voltage automatically balance among the output stage circuits. A controller normally regulates output terminal voltage by operating in voltage mode, but limits current by operating in a current mode when the average of inductor currents exceeds a specified limit. Reconfiguration from parallel to series, or vice versa, is obtained physical reconnection of the output stage terminals and adjustment of a single voltage feedback scaling factor. Connecting the output stages in series to produce a high voltage output reduces voltage stresses on the rectification circuits and enables use of Schottky diodes to avoid reverse recovery problems.

U.S. Pat. No. 6,583,603, issued Jun. 24, 2003, to Baldwin, discloses an apparatus and method for controllably charging and discharging individual battery cells or groups of battery cells in a string of batteries employed as a back-up power supply. The apparatus includes battery supply modules for at least partially isolating battery strings from the load bus and primary power supply. The partial isolation is effected by a switching network including two controlled switches arranged in parallel to selectively isolate the string of batteries. In certain disclosed embodiments, one of the controlled switches is turned on to connect the string of batteries to the load bus until the other controlled switch closes. The system includes a main power supply that supplies a power bus to a regulator in each battery supply module, which is used for charging the battery string, and a discharge bus to each battery supply module for discharging the batteries.

U.S. Pat. No. 6,268,711 issued Jul. 31, 2001, to Bearfield, discloses a battery manager that provides the ability to switch multiple batteries, battery cells, or other forms of power sources to power external devices individually, in series, and/or in parallel. The device is typically electronic based and consists of voltage level detecting circuits for comparing each power source to a reference voltage, FET control logic for controlling the switching matrix, and a switching matrix which accomplishes the required configuration of power sources to provide an output power source. The invention can be extended with the addition of an output power monitor, DC/DC converter, and control signals that augment internal switching. Depending upon implementation requirements, the battery manager can be in the form of a single integrated circuit.

U.S. Pat. No. 6,181,103 issued Jan. 30, 2001, to Chen, discloses a system converting a smart battery pack into a removable and data accessible (RADA) battery pack and an intelligent power management algorithm embedded in the host computer. The RADA battery pack contains a temperature sensor, a display unit, and a memory (EEPROM). Peripherals mounted on the host computer side contain a control unit, a charging circuit, a load circuit, a voltage divider, a current detector, a temperature control circuit, and a data bus are used to cope with the removal and data access operation for the AICPM system. The removable and data-accessible battery pack utilizes the functions provided by this invention to read, update, and record data about the battery pack, such as number of times used, remaining capacity, usable time, and nominal capacity. It also stores these data in the EEPROM of the RADA battery pack so that when the battery pack is used next time, the AICPM system can read out these data from the EEPROM and use them as the battery pack new information.

U.S. Pat. No. 6,031,354 issued Feb. 29, 2000, to Wiley et al, discloses an on-line battery management and monitoring system and method for monitoring a plurality of battery cells identifies and computes individual cell and battery bank operating parameters. The system comprises a central monitoring station to which a plurality of controllers is connected, each controller having a plurality of battery cells which it monitors. Features of the invention include the following: display of measurement and alarm condition data for each of the battery cells connected to each of the controllers; color-coded display of data for a battery cell, the display color being dependent upon the condition of the battery; performance of data analysis and initiation of necessary maintenance requests; operation of the controllers in an automatic local mode, automatic remote mode, or maintenance mode; provision for periodic calls from the controllers to the central monitoring station; and generation of red alarm calls, yellow alarm calls, downscale alarm calls, and diagnostic calls between the central monitoring station and the controllers.

U.S. Pat. No. 5,982,143, issued Nov. 9, 1999, to Stuart, discloses an electronic battery equalization circuit that equalizes the voltages of a plurality of series connected batteries in a battery pack. The current waveform is in the shape of a ramp for providing zero current switching. The transformer has a primary winding circuit and at least one secondary winding circuit. In one embodiment, each secondary winding circuit is connected to a different pair of batteries. The equalizing current is provided to the lowest voltage batteries in one-half of the battery pack during one-half of the charging cycle. The equalizing current is then provided to the lowest voltage batteries in the other half of the battery pack during the other half of the charging cycle. In another embodiment, each secondary winding circuit is connected to a different single battery. The equalizing current is supplied to a lowest voltage battery in the battery pack during each half of the switching cycle. The electronic battery equalization circuit also includes a feedback control circuit coupled to the primary winding circuit for controlling the current from the equalizing current supply source. In another embodiment, optically coupled switches are connected to a battery voltage monitor to provide equalizing current to the lowest voltage even and odd numbered battery in the battery pack.

U.S. Pat. No. 5,923,148 issued Jul. 13, 1999, to Sideris et al, discloses an on-line battery monitoring system for monitoring a plurality of battery cells identifies and computes individual cell and battery bank operating parameters. The system comprises a controller for designating a given battery cell to be monitored, a multiplexer responsive to designation by the controller for selecting a given battery cell to be monitored or for selecting a battery pack to be monitored, an analog board for receiving electrical signals from a given battery cell for providing an output representing measurement of a parameter (voltage, temperature, and the like) of the given battery cell, a voltage sensor circuit for sensing voltage appearing across positive and negative terminals of the battery pack, and a control board responsive to address information for selectively initiating a load test, battery bank charging, or common-mode voltage measurement.

U.S. Pat. No. 5,914,606 issued Jun. 22, 1999, to Becker-Irvin, discloses a circuit and method for making differential voltage measurements when one or both measurement points are at voltages that exceed those allowed by a typical differential amplifier, and is particular useful for monitoring the individual cell voltages of a number of series-connected cells that make up a rechargeable battery in which some cell voltages must be measured in the presence of a high common mode voltage. Each measurement point is connected to an input of a respective voltage divider, with all the divider outputs connected to a multiplexer having two outputs. The two multiplexer outputs are connected to a differential amplifier. When the voltage dividers are "closely matched," the output of the differential amplifier is directly proportional to the differential voltage between the pair of points to which the dividers are connected, and the differential voltage between those two points is accurately determined. The voltage dividers divide down the voltage of each measurement point so that each is low enough to be input to a conventional differential amplifier. By selecting the "ratio" of each voltage divider, the circuit can be used to measure differential voltages in the presence of almost any common mode voltage. The invention requires a single differential amplifier powered by a conventional dual power supply.

U.S. Pat. No. 5,666,040, issued Sep. 9, 1997 to Bourbeau, discloses a safe, low-cost battery monitor and control system. Electronic modules are connected to the terminals of respective batteries that make up a series string. Each module produces a go/no-go signal for each of four battery conditions: over-voltage, under-voltage, over-temperature and float-voltage, which are read by a network controller connected to each module via a single three-wire local area network. Based on the information received, the controller can adjust the charging current to the string, terminate the charge cycle, limit the current drawn from the string when in use, or disconnect the string from the system it is powering. The controller can record a history of the charge and discharge activity of each battery, so that the weakest batteries can be identified and replaced instead of scrapping the entire string. The system controls the charging current delivered to each battery during a charge cycle to insure that each battery is neither overcharged nor undercharged, by connecting a bypass circuit across the battery's terminals to reduce the charging current when an over-voltage condition is detected, or by reducing charge current to the string, A battery's voltage measurement is temperature compensated so that it can be accurately compared to temperature dependant limits. The addressable switch is bidirectional, so that the controller can, for example, force bypass resistors to be connected across selected batteries in order to heat up the batteries in a cold environment.

US Patent Publication 2007/0279003, published on Dec. 6, 2007, to Altemose et al, discloses a system for balancing charge between a plurality of storage battery cells within a storage battery. The battery balancing system sense changes, possibly caused by environmental influences, in the overall resonant frequency of charge balancing circuits contained within the battery balancing system. Using a phase locked loop based controller, the battery balancing system compensates for the change in resonant frequency by driving the battery balancing circuits at a frequency that matches the actual sensed resonant frequency of the battery balancing circuits.

An article by Kong Zhi-Guo et al, is entitled "Comparison and Evaluation of Charge Equalization Technique for Series Connected Batteries", *Power Electronics Specialists Conference*, 2006. PESC '06. 37$^{th}$ IEEE 18-22 Jun. 2006, pp. 1-6.

An article by Jim Williams and Mark Thoren is entitled "Novel measurements circuit eases battery-stack-cell design", EDN, Jan. 10, 2008, p. 47.

An article by N. H. Kutkut et al, is entitled "Charge equalization for series connected battery strings", *Industry Applications*, IEEE Transactions on Volume 31, Issue 3, May-June 1995 pp. 562-568.

The above approaches do not solve the aforementioned problems. Those of skill in the art will appreciate the present invention that addresses the above and other problems.

SUMMARY OF THE INVENTION

An object of the present invention is to provide an improved battery system which is operable for sensing voltages and/or balancing individual cells or banks of battery cells.

Another possible object of the present invention is to provide less complex circuitry for a battery system for sensing voltages and/or balancing individual cells or banks of battery cells.

Yet another possible object of the present invention is to provide a safer battery system with inherent galvanic isolation, which is operable for sensing voltages and/or balancing individual cells or banks of battery cells.

Yet another possible object of the present invention is to provide an improved battery system for sensing voltages and/or balancing individual cells or groups of battery cells while providing the ability to spot a single bad cell in a battery that may comprise several hundred or more battery cells. These and other objects, features, and advantages of the present invention will become apparent from the drawings, the descriptions given herein, and the appended claims.

However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a battery system and method that may be utilized for measuring and/or balancing individual battery cells or banks of battery cells. In one possible embodiment, a battery system may comprise a plurality of transformers electrically coupled to plurality of battery cells. The transformers comprise a plurality of saturable magnetic cores, which are saturable to a first magnetic state or a second magnetic state. In the first magnetic state, the magnetic flux is in a first direction. In the second magnetic state, the magnetic flux is in a second direction, which is different from and may be opposite to the first direction. The saturable magnetic cores are operable for substantially retaining the magnetic state without current flow through the transformers.

Control circuitry connected to the plurality of saturable magnetic cores may be utilized to supply electric current to place the transformers in a first magnetic state or a second magnetic state. The transformers comprise windings for this purpose. The windings may comprise a plurality of row windings and a plurality of column windings, wherein a combination of a particular row winding and a particular column winding may be utilized to address a particular transformer. In one possible embodiment, the battery system may utilize a plurality of row switches and a plurality of column switches connected to the row windings and the column windings for alternately producing the first magnetic state and second magnetic state in a particular core.

The battery system may comprise a plurality of sense windings interconnected to an analog to digital converter. Control electronics may be programmed to obtain a measurement of a voltage of a particular battery cell or particular bank of battery cells while alternately changing the magnetic state of a particular saturable magnetic core. In one embodiment, a semiconductor such as a diode, transistor, or MOSFET may be utilized to permit charging of a cell while preventing leakage.

One or more transformers may be electrically connected to one or more reference voltages instead of battery cells. In this way, if desired, an automatic calibration may be obtained.

In another possible embodiment of the invention, a method is provided for making a battery system. The method may comprise steps such as, for example, electrically coupling a plurality of transformers to a plurality of battery cells. Other steps may comprise providing that the plurality of transformers comprise a plurality of saturable magnetic cores, which are operable for substantially retaining their last magnetic state. The method may comprise connecting control circuitry to the plurality of transformers to supply electric current to place selected transformers in the first magnetic state or second magnetic state.

The method may also comprise providing transformer selection windings to the transformers, which are connected to be operable to address a particular transformer. For example, the selection windings may comprise a plurality of row windings and a plurality of column windings such that a combination of a particular row winding and a particular column winding is used to address a particular transformer.

The method of claim may comprise providing circuitry for alternately producing a first magnetic state and a second magnetic state in a respective one of said saturable magnetic cores to permit measurement of a voltage and/or charging of a particular cell or a particular bank of cells.

The method of may comprise connecting a plurality of sense windings from the transformers to at least one analog to digital converter for measuring analog voltages.

In another embodiment, a method for measuring voltages of battery cells in a battery system may comprise steps such as operating a first row switch to set a first plurality of transformer cores in a corresponding row to a first magnetic state and/or operating a first column switch to set a second plurality of transformer cores in a corresponding column to a second magnetic state. Other steps may comprise operating the row switch again wherein only a particular transformer core at an intersection of the corresponding row and column changes magnetic states. The method may further comprise detecting a voltage of an individual battery cell or bank of battery cells connected to the particular transformer through a sense winding.

In another embodiment, a method for balancing voltages of battery cells in a battery system may comprise steps such as operating a first row switch to set a first plurality of transformer cores in a corresponding row to a first magnetic state.

Other steps may comprise operating a first column switch to set a second plurality of transformer cores in a corresponding column to a second magnetic state. The method may further comprise operating the first row switch again wherein only a particular transformer core at an intersection of a corresponding row and column changes from the second magnetic state to the first magnetic state and then continuing to operate the first row switch and the second row switch whereby charge is added to an individual battery cell or bank of battery cells connected to the particular transformer. The cell voltage can be measured each time charge is added.

In yet another embodiment, a battery system may comprise a plurality of transformers connected to a plurality of battery cells wherein the transformers are electrically connected in groups such as a plurality of rows and a plurality of columns. The transformers may comprise transformer cores and a plurality of sense windings.

A plurality of switches, such as row switches, may be connected to be operable to set selected groups, such as rows, of cores to a particular magnetic state. Another plurality of switches, such as column switches, may be connected to set selected groups, such as columns, of transformer cores whereby a particular transformer core at an intersection is selectable for alternately changing from the first magnetic state to the second magnetic state and possibly back to the first magnetic state one or more times. A detector is operable for detecting a voltage of an individual battery cell or bank of battery cells a corresponding sense winding of the particular transformer.

BRIEF DESCRIPTION OF THE DRAWINGS

FIG. 8 is an electronic schematic diagram showing two parallel strings of series connected battery cells in accord with yet another possible embodiment of the invention;

DETAILED DESCRIPTION OF PREFERRED EMBODIMENTS

Figure 1:
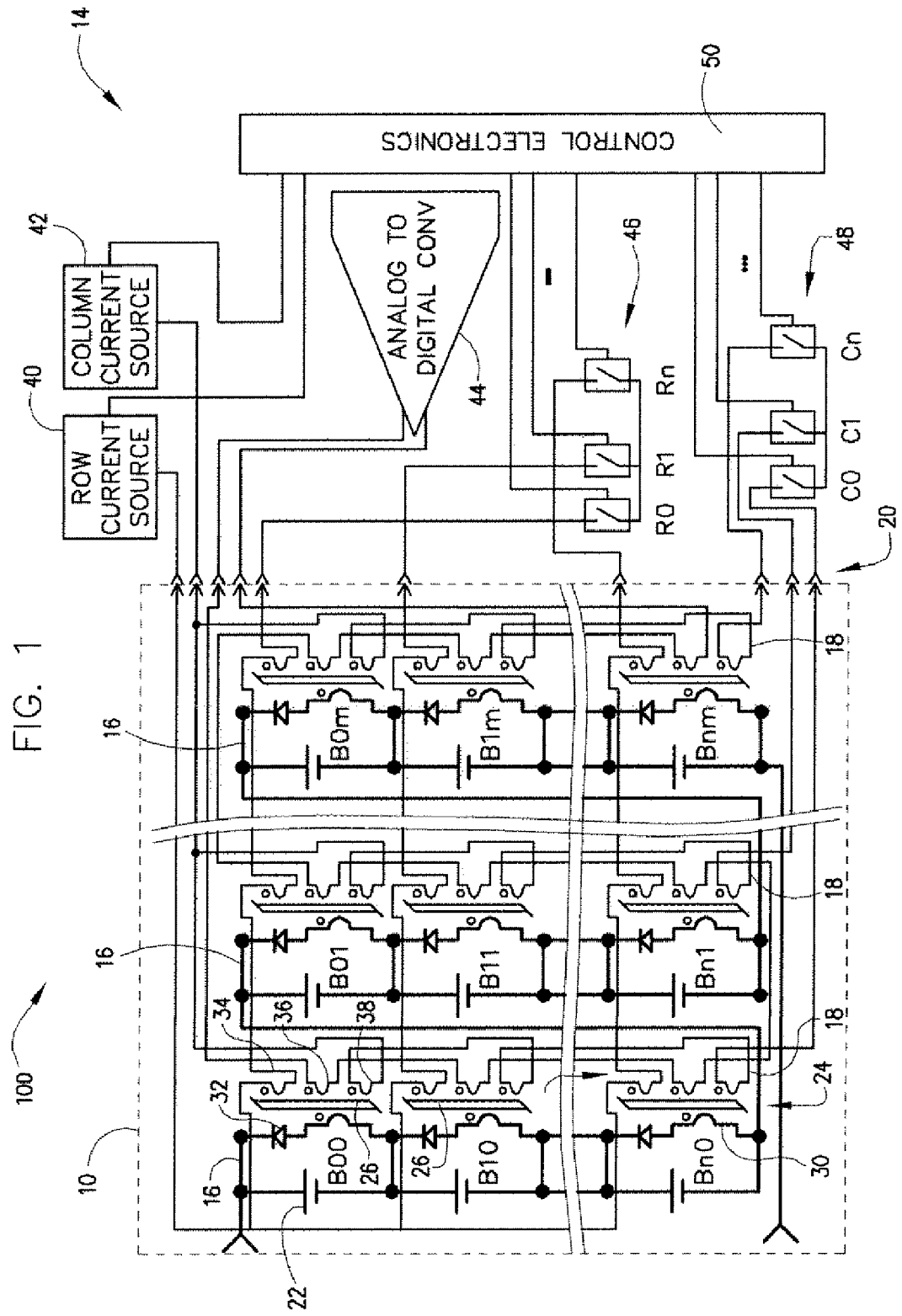
FIG. 1 is an electronic schematic diagram of a battery cell array layout in accord with one possible embodiment of the present invention.

The present invention may be used to monitor individual battery voltages during discharge/charging and to balance the battery cells. Battery cell voltages may be monitored during discharge (battery under load) to detect cells that may have excessive voltage drop due to poor cell health. Battery cells may also be monitored during charging to determine if some cells are not charging at the same rate. To the extent necessary, the present invention may also be programmed to balance the charge of individual battery cells.

The use of transformers in the present invention for sensing and balancing circuitry results in intrinsic electrical isolation of the battery cells. Because sensing is made through the transformers, it is unnecessary to provide fusing on the sense wires. The use of transformers and diodes and/or other semiconductors limits leakage current drains on the cells and provides inherent limits on overcharge rates.

In one embodiment, the present invention utilizes an array of saturating core transformers connected by diodes to battery cells. Transformers are typically designed to operate without magnetic saturation. As well, the core of most transformers is not designed to retain any significant magnetization state. In most applications, it is usually essential to avoid reaching magnetic saturation since it is accompanied by a drop in inductance, which transformers typically require for proper operation. However, unlike typical transformers, the present invention uses magnetic saturation and magnetization of the core advantageously and in a unique way.

Magnetic saturation is a limitation occurring in inductors/transformers having a ferromagnetic or ferrimagnetic core. Initially, as current is increased the magnetic flux increases proportionally. At some point, however, further increases in current lead to progressively smaller increases in magnetic flux. Eventually, the core can make no further contribution to flux growth and any increase thereafter is limited.

In other words, in typical transformer operation, current through the primary winding induces a change in magnetic flux in the transformer core. The change in magnetic flux then induces current flow in the secondary winding. However, if the transformer core is saturated, then a change in magnetic flux is not created by current flow through the primary winding. Thus, there will be little or no resulting current induced in the secondary winding. The transformer essentially ceases to operate when the transformer core is saturated.

The present invention utilizes transformers designed to saturate, as discussed in more detail in the paragraphs hereinafter. Briefly, in one embodiment only a selected transformer continues to operate. To make a measurement in a particular battery, the present invention applies a pulse to a selected transformer with a current direction that produces magnetic flux in a direction opposite to the direction of flux saturation. The selected transformer then saturates in the opposite direction. In other words, the selected transformer creates a change in magnetic flux in response to current in the primary winding. Therefore, a sense winding will detect this change in flux, thereby detecting a voltage in the battery connected to the selected transformer. Only the selected transformer continues to operate due to magnetic flux change. Other non-selected transformers remain saturated in the same direction, and do not operate, and do not contribute any significant amount to the induced current in the sense coil of the selected transformer.

In the present invention, windings on the transformers may be used to allow an individual transformer to be selected by selectively saturating the core, whereupon the voltage of the associated battery cell may be measured. In this embodiment, a charge can also be transferred to the cell to balance the selected battery cell.

The transformers may be electrically arranged in physical or virtual rows and columns with row and column windings. The voltage amplitude of the pulses is limited by the diode and battery cell connected to the transformer, which may be measured with an analog to digital converter connected to a sense winding. In one embodiment, the sense winding may be directed through the entire group of transformers, but saturation prevents all except the selected transformer making a contribution to the reading.

The addressable magnetic cores take advantage of a square hysteresis loop to retain, at least substantially, their magnetization state when no current is applied. A matrix of addressable magnetic cores was frequently used in magnetic core memories about fifty years ago. However, those magnetic core matrixes were used simply to store information in the cores in the form of a flux state, which represented either a digital "1" or "0." They were not used for measuring analog values, and were unrelated to measuring analog values of a matrix of battery cell voltages and/or for balancing the cell voltages. In one possible embodiment, the present invention does not require addressing the row and column simultaneously, as was typically done previously in magnetic core memories. However, the present invention is not limited to any particular wiring arrangement for addressing and/or changing the magnetic flux states of the magnetic cores to measure and/or balance the battery cells.

Figure 2:
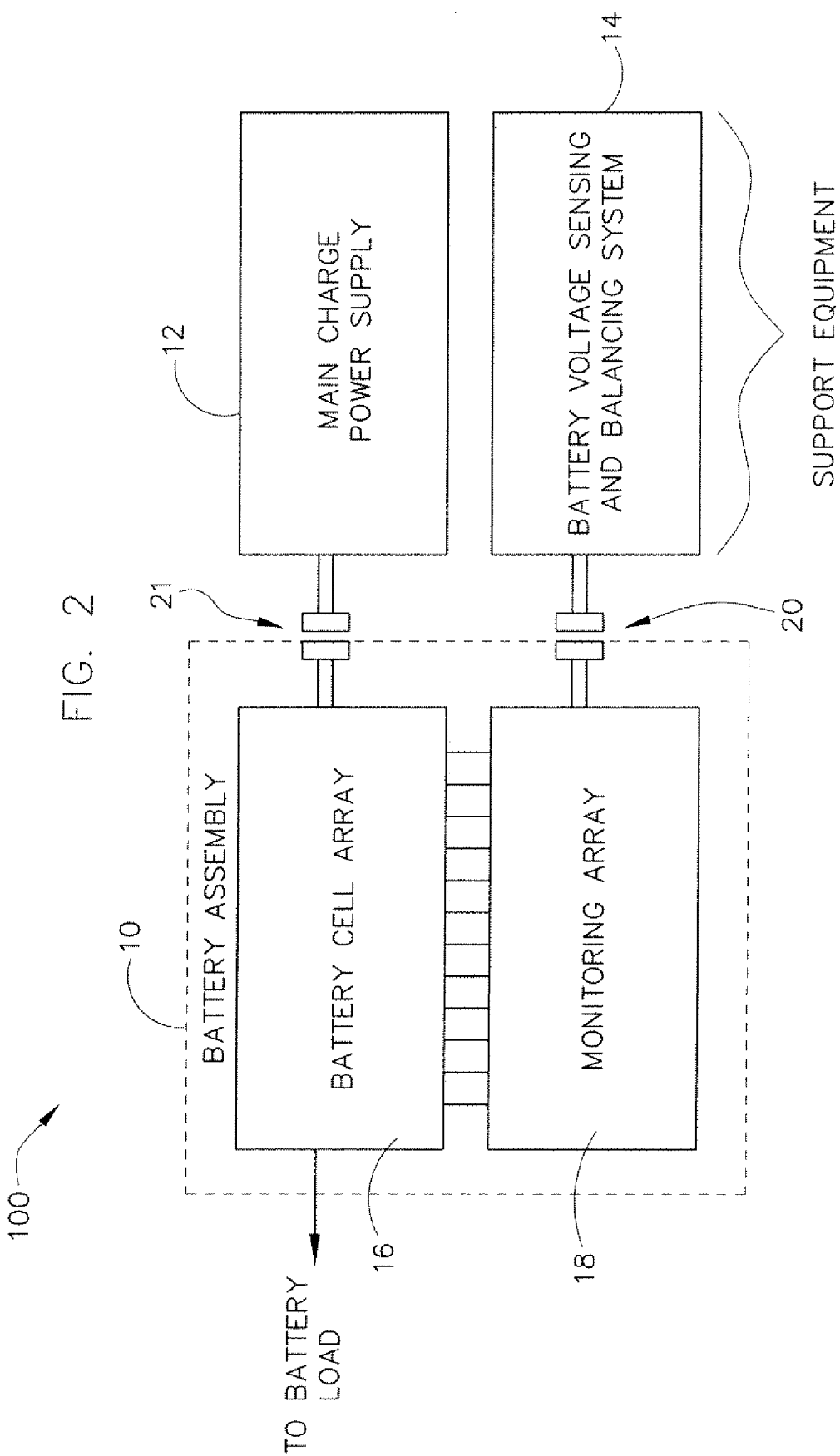
FIG. 2 is a block diagram for battery system in accord with one possible embodiment of the present invention.

Referring now to the drawings and, more particularly, to FIG. 1 and FIG. 2 there is shown one possible embodiment of battery system 100 in accord with the present invention. Battery system 100 may comprise battery assembly 10, which includes battery cell array 16. Battery cell array 16 may comprise parallel and/or series connected battery cells that store electrical energy. In FIG. 1, battery cell array 16 is darkened to allow the array to stand out more clearly.

Monitoring array 18 comprises transformer cores and interconnecting wires that allow the voltages of individual cells to be measured. Charge may be put in individual battery cells as desired. Monitoring array 18 may also comprise switch elements such as diodes, semiconductor switches, and the like. In this example, diodes such as diode 32 are shown connected to the winding of the transformers to which the battery cells are connected.

Battery voltage sensing system 14 connects to monitoring array 18 and comprises circuitry for measuring and/or balancing cell voltages. In this example, battery voltage sensing system 14 connects to monitoring array 18 via one or more connectors, designated as connector 20, and provides pulses for sensing and charging. In one embodiment, battery voltage sensing system 14 is separate from main charge system 12. In one possible embodiment, battery voltage and sensing system 14 may be designed to have the following functions:

1. Provide row and column pulses to select transformers and associated cells.
2. Measure the characteristics of the pulses on the sense winding to determine the voltage of the cells.
3. Supply balancing currents to selected cells by repeatedly pulsing the appropriate row and column windings.
4. Measure any reference voltages in the battery and perform self-calibration.
5. Report measured voltages to the user or an external computer system or network.
6. Decide which battery cells or cell banks need balancing currents.

As one embodiment, the present invention may be designed to be operable in parallel with what may be a simple battery charger that supplies the main charge current, such as main charge power supply 12. Main charge power supply 12 may be connected to battery assembly 10 with connector 21. The present invention can monitor cell voltage during and after charging. However, in one presently preferred embodiment, the balancing function is operated after the main charge currents are shut off.

Although the individual circuit elements are shown in detail hereinafter, the battery cells in FIG. 1 are labeled B00 to Bnm, with the m numbers being the rows, and the n numbers being the columns. The maximum array size is set by wire resistance and parasitic inductances in the collective sense windings that would cause waveform degradation. Utilizing only the circuitry of the embodiment shown in FIG. 1, an array of several hundred cells could be monitored. However, additional separate circuitry can be added to permit monitoring of any number of battery cells.

An example of a typical battery cell from FIG. 1 is battery cell B00, which may be labeled as battery cell 22, and is represented by a positive and negative electrode.

Figure 4:
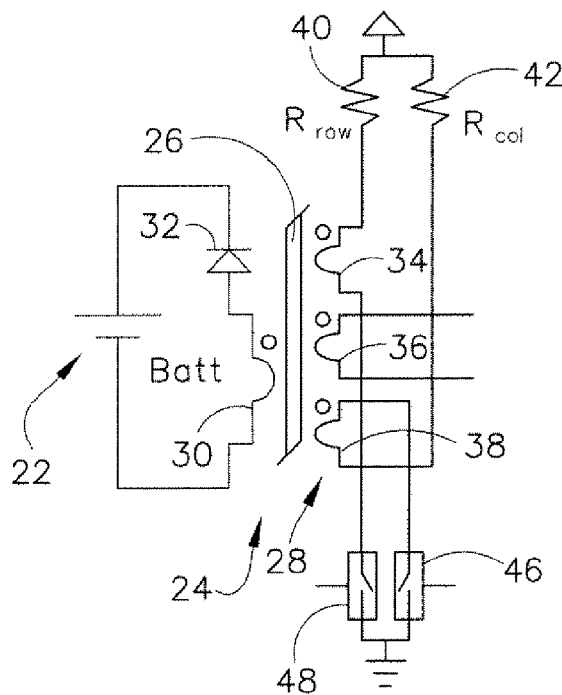
FIG. 4 is an electronic schematic diagram which shows a simplified circuit diagram associated with a single battery cell from an array of battery cells in accord with one possible embodiment of the present invention.

Referring to FIG. 4, there is shown a simplified drawing of battery cell 22. In FIG. 4, a typical transformer 24 is associated with battery cell 22. Transformer 24 has windings 28 and 30, which may be referred herein to as secondary and primary windings, respectively. In this embodiment, each individual battery cell is connected to an associated transformer. However, other embodiments may have other arrangements between battery cells and transformers, and some of the other possibilities are discussed hereinafter. Primary winding 30 is connected to the battery cell associated with the transformer. In this embodiment, diode 32 may be utilized to allow charging current to flow into battery cell 22 but prevent leakage that would drain the battery. The secondary windings 28 comprise three separate windings, which include row select winding 34, column select winding 38, and a sense winding 36.

As can be seen in FIG. 1, the sense winding may pass through or be connected through all transformers. For example the sense windings may be series connected. It is then possible to measure all battery cell voltages of each battery cell or each bank of battery cells. As discussed hereinafter, the selection process permits measurement of individual battery cell voltages even if all transformer sense windings are connected in series.

The row select winding, such as row select winding 34, connects with all the transformers in a given row or virtual row of the transformer matrix.

The column select winding, such as column select winding 38, can be seen to connect with all the transformers in a given column or virtual column of the transformer matrix.

Figure 6:
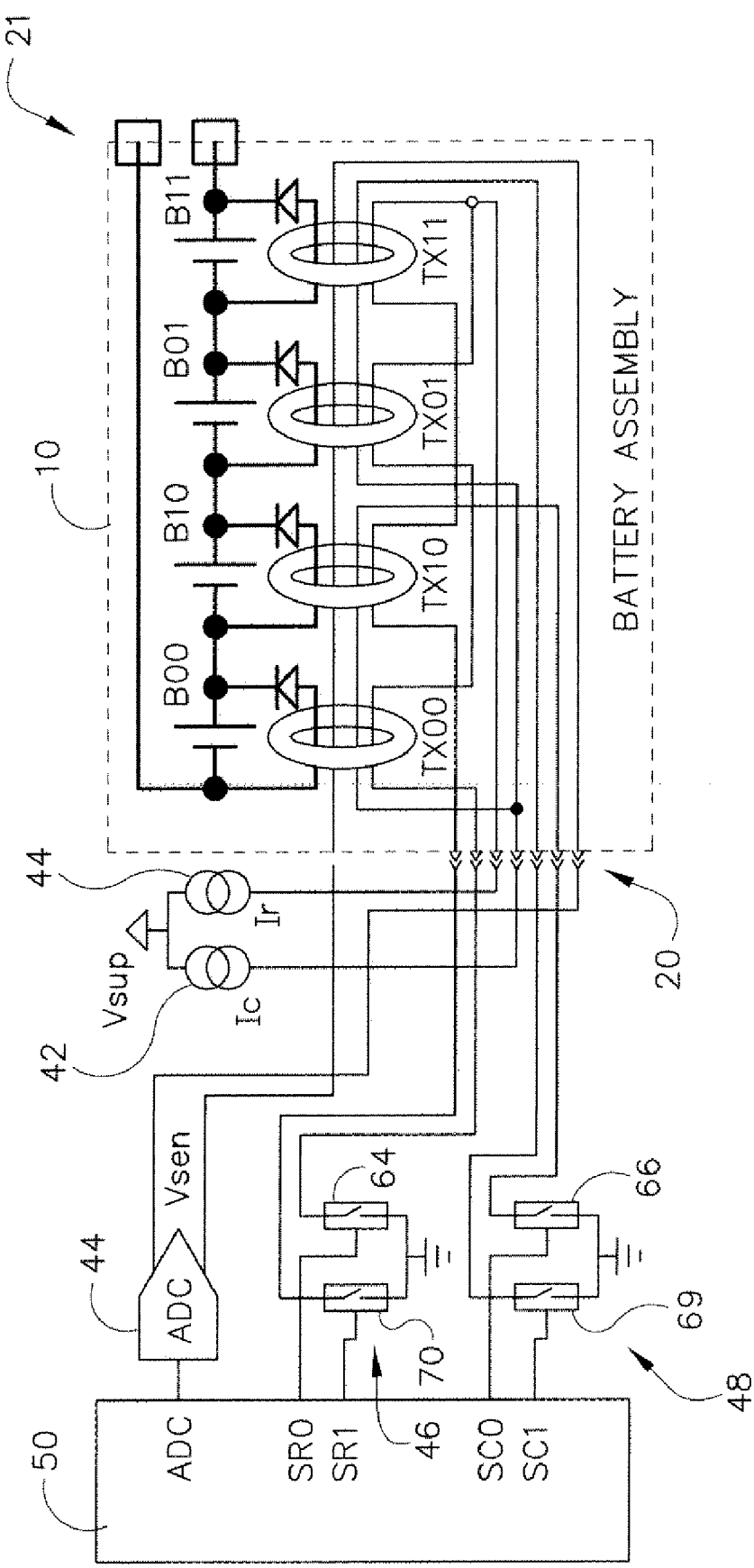
FIG. 6 is an electronic schematic diagram of a 2×2 battery cell array for use with FIG. 6 in accord with one possible embodiment of the invention.

While columns and rows are used herein to provide an easier and quicker understanding of the invention concepts, the actual physical layout may or may not correspond to this description. More generally, column and row descriptions may refer to a virtual column or row which may not be physically arranged as are the electrical connections. For example, FIG. 6 shows a circuit that is physically arranged as a single 4×1 array, but is electrically connected as a 2×2 array. The operation is described in terms of a 2×2 array with columns and rows. Thus, the use of column and row terminology is a convenient means visualizing the addressing techniques and understanding addressing of individual transformers. The column and row terminology of the invention is not limited to this wiring configuration and could have, for example, a 3-D structure with other windings, which may be configured to select individual transformers or transformer cores, as discussed hereinafter.

In other words, it will be understood that rows and columns as used herein may or may not correspond to physical rows and columns. Instead, rows and columns may be electrically configured in rows and columns. More generally, the rows and columns actually correspond and are intended herein to refer to groups of transformers and battery cells that are more easily visualized in rows and columns. For example, "row" 0, and "column" 1 are labels that correspond, in matrix terminology, to a first group 01 and second group 02 which have an intersection at a particular transformer. Thus, rows and columns are simply easily understandable labels for various groups of transformers and battery cells. The terms row and column more easily provide a visual description of how a combination of a particular row winding and a particular column winding may be utilized to address a particular transformer, but in the present invention, row and column may also mean groups with intersection points.

Figure 9:
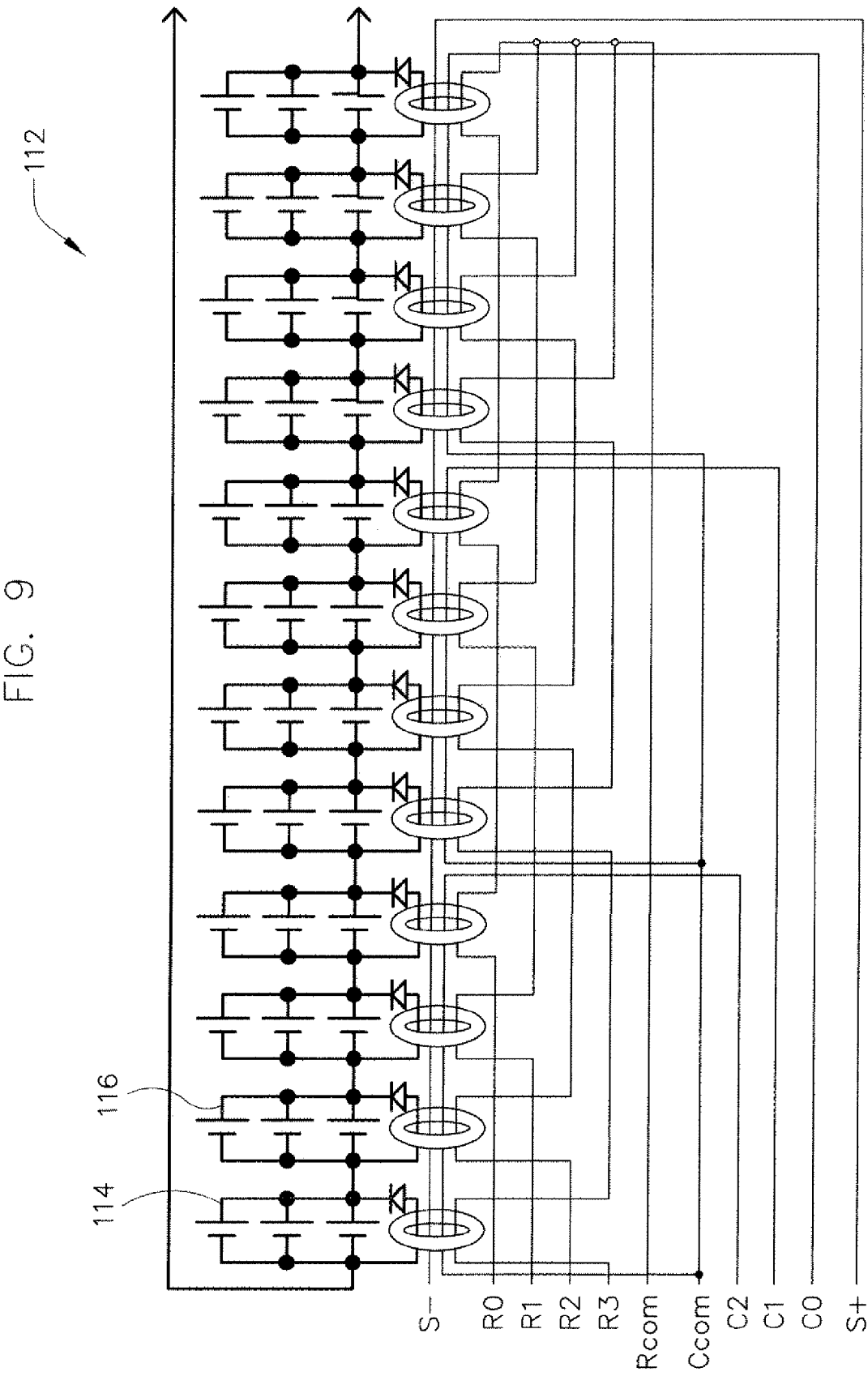
FIG. 9 is an electronic schematic diagram showing series connected banks of battery cells in accord with yet another possible embodiment of the invention.

In one embodiment of the invention, each battery cell (or bank of parallel battery cells as shown in FIG. 9) has a single transformer associated with it. As discussed above, the transformers may be electrically but perhaps not physically arranged in a matrix with rows and columns. This matrix does not need to correspond with the physical arrangement of the battery cells. For instance, there could be a single string of 24 cells with the corresponding transformers electrically arranged as a matrix of four rows and six columns. It is possible to have additional transformers in the matrix that are not associated with cells.

In the embodiment of FIG. 1, row and column current sources 40 and 42 may be utilized for saturating the transformer magnetic cores with a desired magnetic flux direction or magnetic state as discussed hereinafter. In one embodiment, a voltage supply and current limiting resistor may be utilized for current sources 40 and 42, which in combination effectively provides a current supply.

Pulses are produced utilizing current from row and column current sources 40 and 42 as row and column switches 46 and 48 are opened and closed. The pulses applied to the row and column windings should be sized to be able to swing one core from one magnetic extreme to the other. In one embodiment, the pulse generation circuitry is able to handle a momentary direct short once the cores are saturated. Therefore, a current source may be utilized although any suitably reliable power supply may be utilized so long as it operates as discussed herein. An inductive type current source may have difficulties with resetting. A transistor type current source may reduce the duration of spikes due to the inductance of the transformer. If desired, the current source may be shared between rows or columns because in one possible embodiment only one row or column at a time is pulsed.

Analog to digital converter (ADC) 44 may connect to the collective sense windings of the transformers to measure individual cell voltages as discussed hereinafter. Row switches 46 and column switches 48 are utilized to control the electrical current through the row and column current windings, and in this manner address particular transformers. Control electronics 50 are utilized to operate the aforementioned devices as discussed hereinafter. If desired, additional analog to digital converters could be connected to different groups of transformers to limit the collective length of the current windings in any particular group.

Figure 3A:
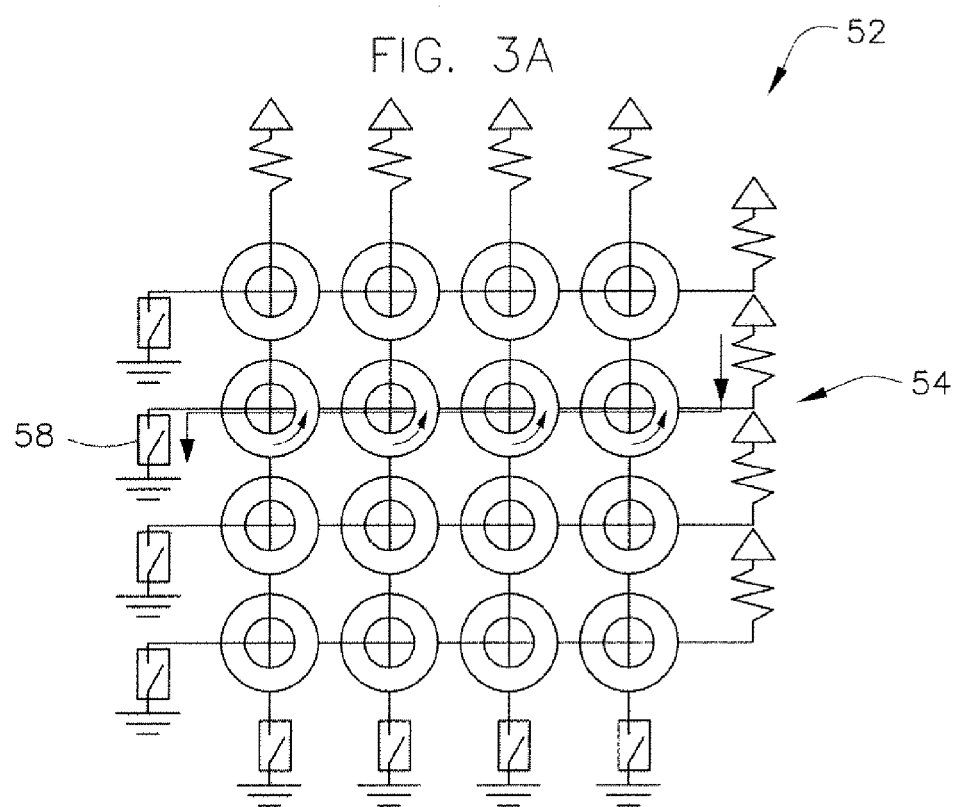
FIG. 3A is an electronic schematic diagram which illustrates a possible step of magnetizing cores CCW in a selected row N by closing a row switch in accord with one possible embodiment of the present invention.
Figure 3B:
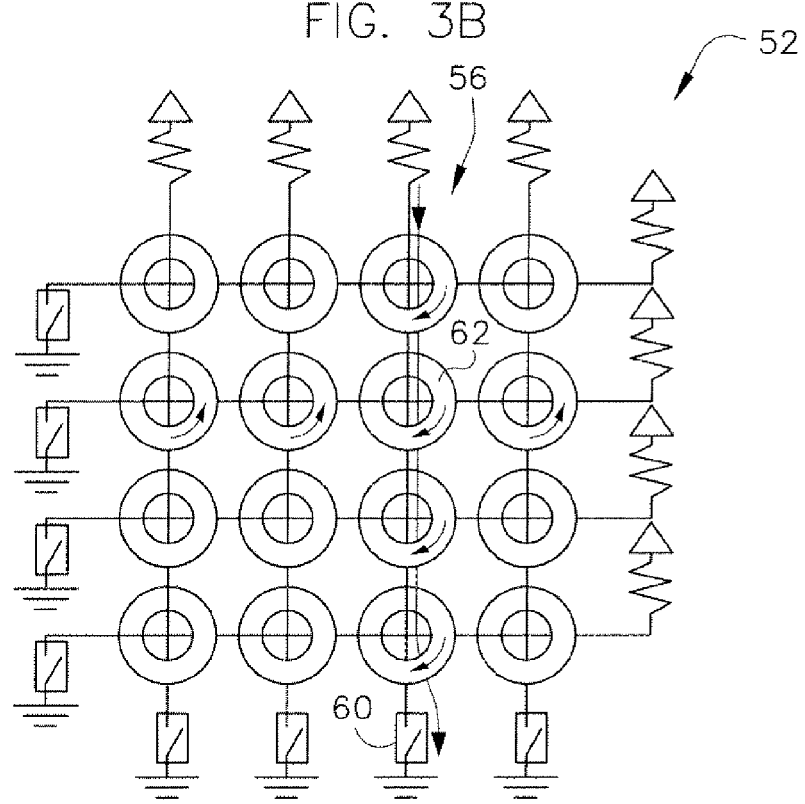
FIG. 3B is an electronic schematic diagram which illustrates a subsequent possible step from that shown in FIG. 3A, whereby in FIG. 3B cores in a selected column are magnetized CW by closing a column switch in accord, which results in a particular core in row N being the only core that is magnetized CW in accord with one possible embodiment of the present invention.

Array addressing operating principles of one possible embodiment of the present invention are illustrated in FIGS. 3A and 3B. A 4×4 array of transformers and transformer cores 52 is shown in FIGS. 3A and 3B. In the following steps, transformer core 62 is selected. Step 1: Row switch 58 is momentarily closed, whereby all cores in row 54 are magnetized to a first magnetic state such that the magnetic flux for each core flows in a first direction. As an example, the direction of the magnetic flux may be counterclockwise (CCW) as indicated by the arrows. Row switch 58 may now be opened again. Step 2: Column switch 60 is momentarily closed whereby all cores in column 56 are magnetized in a second magnetic state such that the magnetic flux flows in an opposite direction. For example, the direction of the magnetic flux may be clockwise (CW) as indicated by the arrows. Now, desired core 62 has been selected because it is the only core in row 54 that is magnetized CW. As discussed in the following paragraphs, voltage measurements or power transfer for individual battery cells can be performed by using this addressing scheme.

Figure 7A:
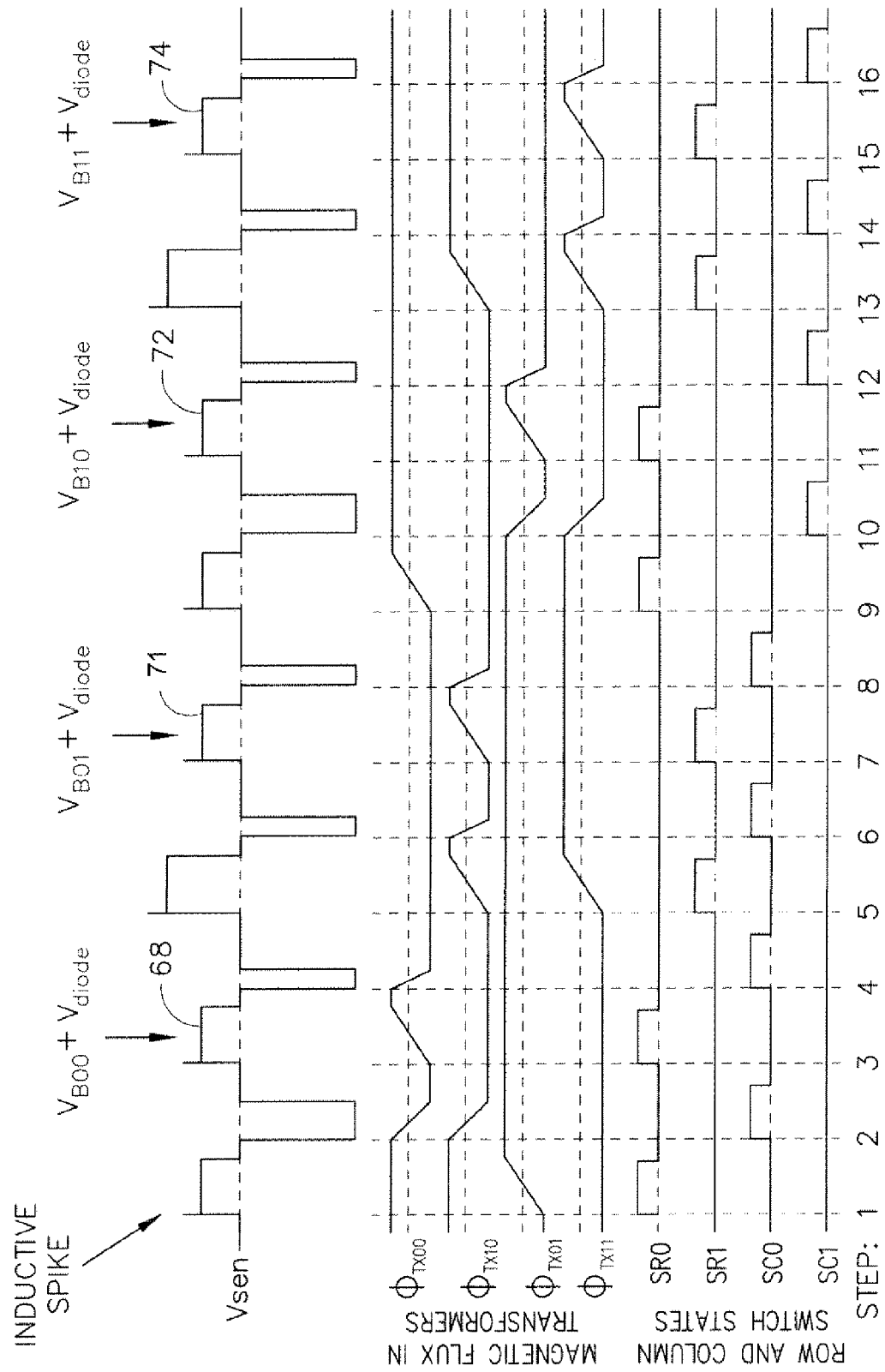
FIG. 7A is a pulse diagram example of selected measurement points in the 2×2 battery cell array of FIG. 6 during sixteen possible battery cell measurement steps that measure the individual voltages of the 2×2 battery cell array in accord with one possible embodiment of the invention.

FIG. 6 and FIG. 7A illustrate operation principles for cell measurement in accord with one possible embodiment of the invention. In this example, for ease of understanding, battery assembly 10 of FIG. 6 comprises a 2×2 array. The following method samples the cell voltage of each cell, as indicated at pulses 68, 71, 72, and 74, on the Vsen signal line shown in FIG. 7A. The signal flow chart of FIG. 7A is conveniently broken into sixteen steps as numbered at the bottom of the chart. ADC 44 measures voltages during pulses as shown by the Vsen signal line shown in FIG. 7A. The present invention may be utilized to perform the selection function by exploiting the nonlinear saturation and magnetization characteristics of transformers. In this embodiment, an individual transformer is addressed and the corresponding cell selected by alternately pulsing its row winding with positive pulses and its column winding with negative pulses.

As a general explanation of one embodiment of operation, when a row winding and column winding are alternately pulsed, all the transformers that share the sense winding fall into one of 4 classes.

A first group of transformers receives no pulses because neither their row nor column windings are pulsed. These transformers do not affect the amplitude of the pulse on the sense winding, which is measured by ADC 44.

A second group of transformers receive only positive pulses on their row windings. After one or more pulses, these transformers will be saturated in a desired magnetic state. After several such pulses, they contribute negligibly to the sense winding pulse detected by ADC 44.

A third group of transformers receive only negative pulses on their row windings. After several such pulses, they are also saturated and will contribute negligibly to the sense winding pulse detected by ADC 44.

Finally, a selected transformer at the intersection of the selected row and column receives both positive row pulses and negative column pulses. This transformer alternates between positive and negative pulses. This transformer becomes the only transformer to produce a significant contribution to the sense winding. The positive pulses will forward bias the diode connected to the corresponding cell. This puts a small charge current into that cell, which when repeated may be utilized for balancing the associated battery cell. The voltage of the positive pulse is set by the diode forward voltage drop and the cell voltage.

A detailed description of measurement steps for all four cells of battery assembly 10 of FIG. 6 is as follows:

Measure Voltage of Cell B00 (Row 0, Column 0)
1: Control electronics 50 is utilized to close row switch 64 to set all transformer fluxes in row 0 to a first flux state, which may be referred to as a positive flux state. Looking at the signal flow chart, SR0 (FIG. 7A) shows the positive pulse applied to row switch 64 by control electronics 50. When current from current supply 44 flows through the row windings, this saturates the cores of TX00 and TX01 (row 0) to a positive magnetic flux state as shown in signal flow chart 7A. Row switch 64 is then opened as indicated by the pulse in SR0 of signal flow chart 7A. It will be noted that TX00 and TX01 are in row 0 based on their matrix identifier rather than being physically shown as being in a row 0. As discussed above, the terms "row" and "column" as used herein are not limited to physical rows and columns. Instead "row" and "column" are simply terms to describe groups of cores that have common intersections, which intersections are more easily visualized when discussing columns and rows.

2: Reset all fluxes in column 0 to a negative magnetic flux state by closing column switch 66. In other words, control electronics 50 applies a momentary pulse that closes column switch 66, allowing current from current supply 42 to flow through the column windings that are connected as column 0. In particular, this saturates TX00 to a negative magnetic flux state. Note that Vsen goes to a negative value, namely, −Vsup. This pulse has a longer duration to reset multiple transformers. See also the equivalent circuit shown in FIG. 5B, which is discussed hereinafter, 3: Again, momentarily close row switch 64 to set fluxes in row 0 to a positive magnetic flux state. This will only result in flux change in TX00. The other transformers do not change their magnetic state and therefore do not induce voltage on the sense winding. Thus, at this time, Vsen=$V_{B00}$+Vdiode. The voltage measurement may be taken after the initial spike on Vsen, such as in middle of pulse. Vsen is measured by ADC 44. See also the equivalent circuit shown in FIG. 5A, which is discussed hereafter. In other words, the voltage of a particular battery cell, namely battery cell B00 has now been measured in accord with one embodiment of the present invention. The process goes on to measure the voltage of all four battery cells.

Measure Voltage of Cell B10 (Row 1, Column 0)
4: Reset fluxes in column 0 to a negative magnetic flux state, e.g. control electronics 50 momentarily activates switch 66.
5: Set the fluxes in row 1 to a positive magnetic flux state, e.g., activate switch 70. The Vsen measured by ADC 44 will now be the sum of two battery voltages (plus diode drops) because two magnetic flux states change to a positive magnetic flux state, namely that of TX10 and TX11 as shown in FIG. 7A.
6: Reset column 0 fluxes to a negative magnetic flux state. This changes only TX10 to a negative magnetic flux state, as shown in FIG. 7A.
7: Set the fluxes in row 1 to a positive magnetic flux state. This will only result in flux change in TX10, and Vsen=$V_{B10}$+Vdiode. The voltage measurement may be taken after the initial spike on Vsen, such as in middle of pulse.

Measure Voltage of Cell B01 (Row 0, Column 1)
8: Reset column 0 fluxes, e.g., activate switch 66.
9: Set row 0 fluxes, e.g., activate switch 64.
10: Reset all column 1 fluxes negative, e.g., activate switch 69.
11: Set the fluxes in row 0 to a positive magnetic flux state, e.g., activate switch 64. The magnetic flux state of TX01 goes high, as shown in FIG. 7A. The voltage pulse will read Vsen=$V_{B01}$+Vdiode, when the voltage measurement is taken after the initial spike, such as in the middle of pulse.

Measure Voltage of Cell B11 (Row 1, Column 1)
12: Reset column 1 fluxes to a negative magnetic flux state, e.g., activate switch 69. As shown in FIG. 7A, the magnetic flux state of TX01 saturates negative. The magnetic flux state TX11 is already negative.

13: Set row 1 fluxes, e.g., activate switch 70. Since two cores change, Vsen is the sum of two battery voltages (plus diode drops). The magnetic flux state of TX11 goes positive.

14: Reset column 1 fluxes to a negative flux state. The magnet flux state of TX11 goes negative.

15: Set the fluxes in row 1, e.g., activate switch 70. Then, $V_{sen}=V_{B11}+V_{diode}$. The voltage measurement may be taken in middle of pulse.

16: Reset column 1 fluxes.

Figure 7B:
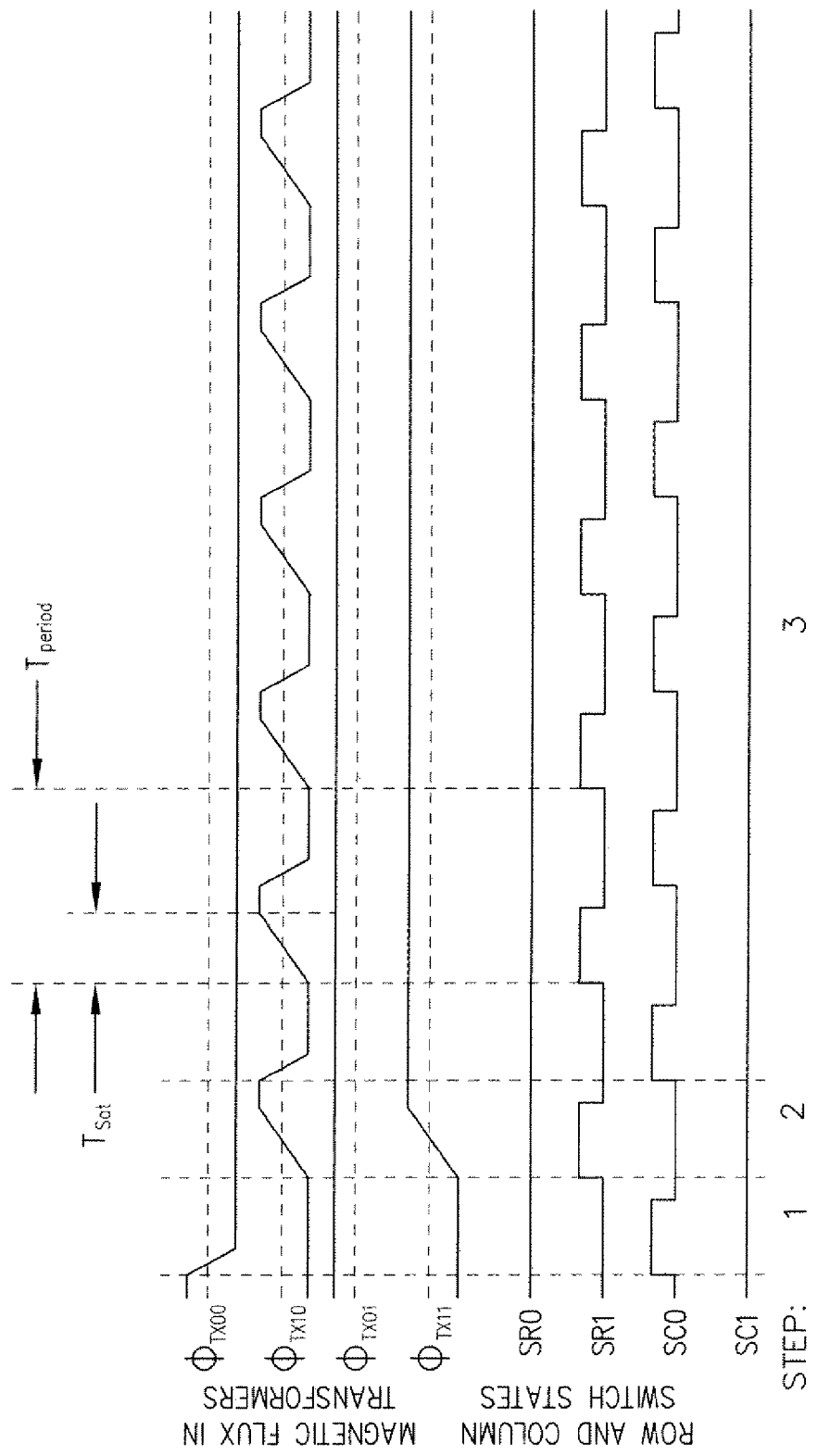
FIG. 7B is a pulse diagram example of selected measurement points in the 2×2 battery cell array of FIG. 7A during possible steps to balance battery cell B10 of the 2×2 battery cell array in accord with one possible embodiment of the invention.

FIG. 7B is a signal diagram that illustrates the signals involved in cell balancing. In this example, cell B10 of FIG. 7A is balanced, i.e., charge is added to cell B10. As seen above, any cell could be selected to balance.

Steps Involved in Balancing Cell B10 (Row 1, Column 0):

1: Set column 0 fluxes to a negative magnetic flux, e.g., pulse switch 66 as shown in step 1 of FIG. 7B via control circuitry 50. Then the magnetic flux state of TX00 and TX10 are both saturated negative.

2: Set all transformer fluxes in row 1 to a positive magnetic flux, e.g. pulse switch 70. Both TX10 and TX11 are now saturated to a positive magnetic flux state.

3: Reset all fluxes in column 0 negative. Only TX10 goes to a negative magnetic flux as shown in FIG. 7B. Then, alternate applying pulses between switch 70 for row 1 (SR1) and switch 66 for column 0 (SC0). The flux state of TX10 alternates between saturating positive and negative. This process acts as a simple switching power supply and charges B10 with the following current:

$$I_{charge}=I_R*(T_{Sat}/T_{Period})$$

where $T_{sat}$ (the time for saturation) and $T_{Period}$ (the period of the recharging cycle) are shown in FIG. 7B

In this way, if a cell is measured as being below the voltage of other cells, the cell can be balanced or charged up. The cell voltage can be simultaneously monitored as shown in step 7 of the cell voltage measurement as shown in FIG. 7A. In the disclosed embodiment, charge current may range up to a few hundred milliamps. The charge current can be increased with additional transformer winding turns. It should be noted that a "transformer winding" as used herein might go through the transformer core without looping around the core.

While only charging is illustrated, if the diodes are replaced with switches, such as FETs, so that current could flow in either direction through the batteries, then the same techniques discussed hereinbefore may be utilized to select particular cells for either adding charge to or subtracting charge from individual battery cells. Accordingly, the present invention is not limited to only charging batteries for balancing.

The battery connector(s) pin count is kept quite efficient in accord with the present invention. For example, if the battery has N cells, and N Is less than or equal to the number of rows (R) times the number of columns (C), then the total number of connector pins would be R+C+4. There would need to be one for each row, with one common to all rows, one for each column, one common to all columns, and two for the sense winding, for a total of R+C+4.

For numbers of cells less than about 10, the direct sense line connection may be optimum. However, for batteries with more than about 30 cells, the number of contacts for direct sense lines (the standard battery practice) in the prior art is more than double that necessary for the present invention.

Figure 5A:
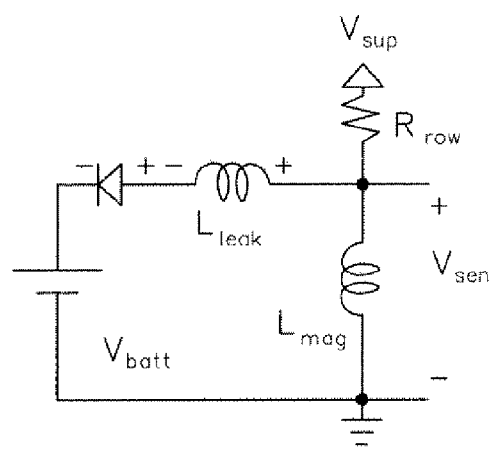
FIG. 5A is an electronic schematic diagram which shows an equivalent circuit for a saturable transformer after closing row switch in accord with one possible embodiment of the invention.

In more detail of operation of both cell measurement and balancing, and referring to FIG. 5A and the Vsen line in FIG. 7A, there is shown an equivalent circuit after initial closing of the row switch where the magnetic flux is initially negative for the circuit but then eventually saturates with a positive magnetic flux. The sense line Vsen therefore detects a positive pulse. The leakage inductance causes an initial spike on Vsen, as shown on the leading edge of positive pulses in FIG. 7A. The time constant that sets the time for leakage inductance to charge up can be adjusted by selection of $V_{sup}$ and $R_{Row}$, which: form the current supply. During this step, charge is also supplied to the battery as discussed hereinbefore. In one preferred embodiment, the time for leakage inductance to charge up is less than half of the time for the core to saturate to permit good measurements. However, this time may considerably faster. In this embodiment, after the leakage inductance spike has died down, then $$V_{sen}=V_{batterycell}+V_d$$

where $V_d$ is the voltage drop across the diode, and $V_{battery\ cell}$ is the battery cell voltage.

Figure 5B:
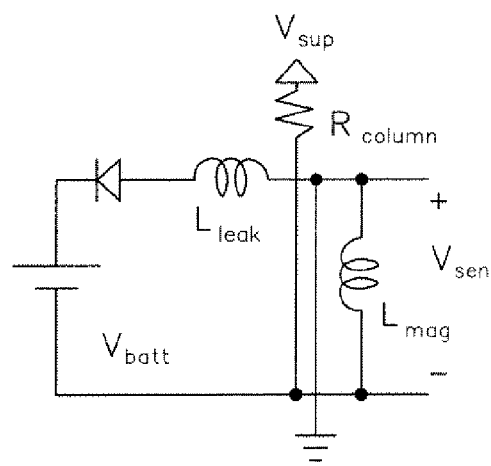
FIG. 5B is an electronic schematic diagram which shows an equivalent circuit for a saturable transformer column after closing column switch in accord with one possible embodiment of the invention.

FIG. 5B shows the equivalent circuit after closing the column switch, whereupon the magnetic flux eventually changes from positive to negative. The diode in this case is reverse biased because the column winding is oppositely wound than the row winding. See for example row winding 34 and column winding 38 in FIG. 1. After the column switch is closed, Vsen goes to −Vsup until the core saturates. This can be seen as the negative pulses on the Vsen trace in FIG. 7A. When more transformers change magnetic flux states, the negative pulse is wider.

Referring now to FIG. 8, there is shown series parallel circuit 102, which discloses one of many possible variations of the present invention. In this example, series connected strings of cells 104 and 106 are connected in parallel as indicated by parallel connections 108 and 110. It will be appreciated that each individual battery cell is associated with a transformer as discussed hereinbefore. Therefore, each battery cell voltage may be individually measured and the cell balanced as discussed hereinbefore.

Referring to FIG. 9, there is shown another of many possible variations, namely series bank circuit 112. In this example, subsequent parallel-connected banks of battery cells are also connected in series. In FIG. 9, representative battery cell banks 114 and 116 each have three cells connected in parallel, although other numbers of cells may be connected in the banks. With each bank is associated a transformer whereby the voltage of each bank may be measured and balanced.

Figure 10:
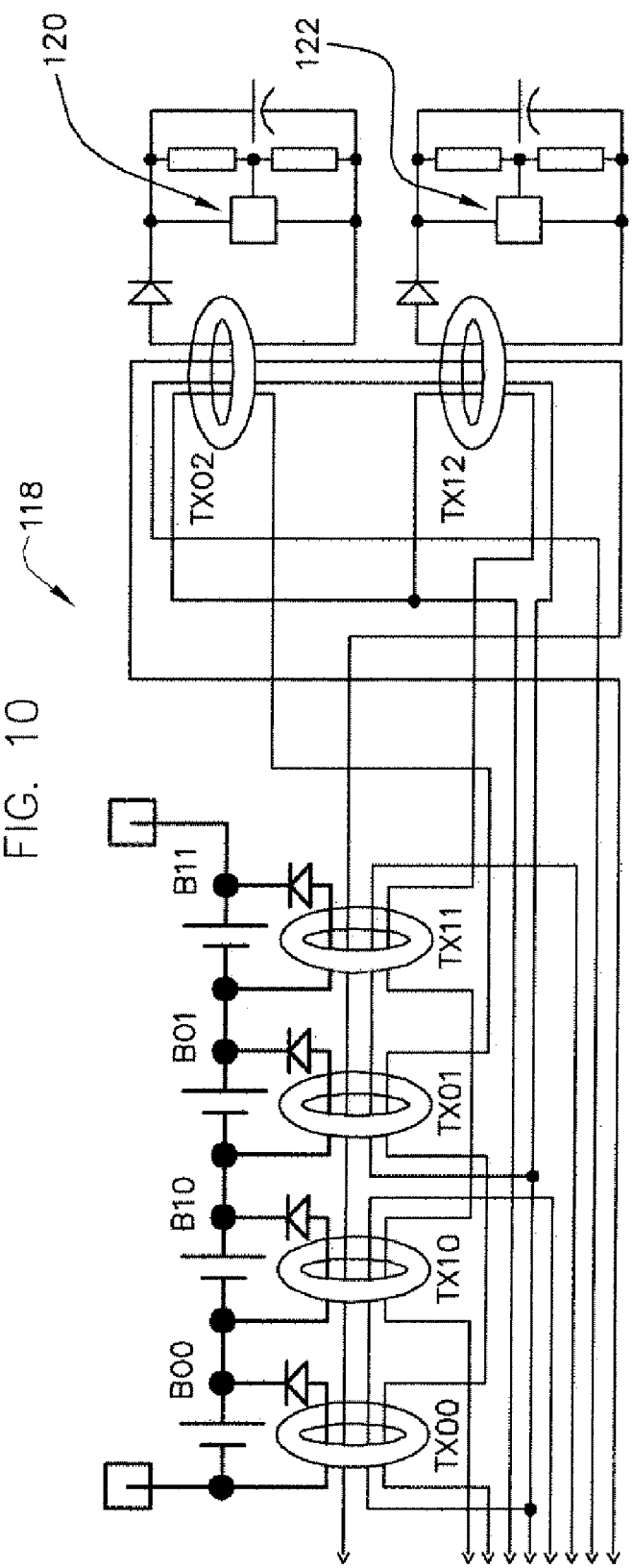
FIG. 10 is an electronic schematic diagram which utilizes additional transformers that provide precision voltages references that might be utilized for auto calibrations to improve cell voltage measurement accuracy in accord with yet another possible embodiment of the invention.

Another possible embodiment of the present invention is shown in FIG. 10 where circuit 118 may utilize additional transformers besides those used to measure and balance cells, e.g., transformers TX02 and TX12. In this example, TX02 and TX12 are connected to precision voltage references 120 and 122. Voltage reference 120 may be set to a maximum normal cell voltage. Voltage reference 122 may be set to a minimum normal cell voltage. In this way, measurements by analog to digital converter 44 (see FIG. 1) may be accurately calibrated automatically, perhaps with each cycle of measuring battery cell voltages.

Although many types of precision voltage references are available, one type of suitable voltage regulator may comprise a TL431 or similar type connected to the transformer utilizing the same type of diode such as diode 32 shown in FIG. 4. In this example, the transformer and the diode, which may be the same as those used for measuring the battery cells, are connected to a shunt voltage reference and capacitor. The capacitor is charged up by the diode, and its voltage is limited by the shunt. The control electronics 50 (see FIG. 1) may then be programmed to perform an auto calibration at any desired intervals to reduce cell voltage measurement inaccuracies. In sum, measurement accuracy may be improved by including one or more of these voltage reference channels that include matching circuitry as that utilized for measuring the battery cell voltages.

Figure 11:
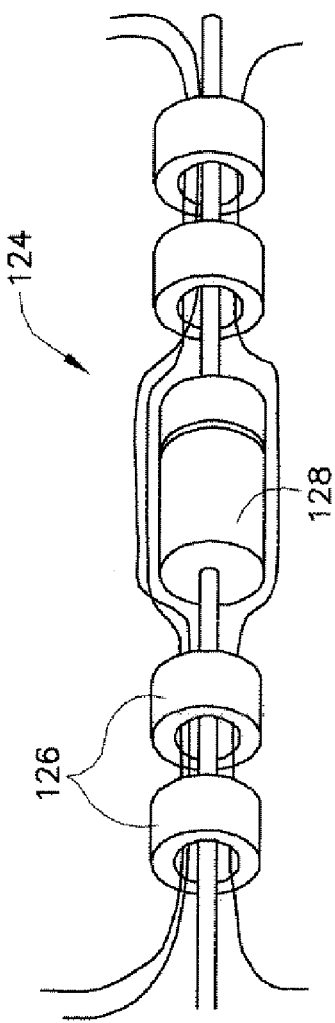
FIG. 11 is a physical layout, which shows multiple transformer cores, diode, and related wiring in accord with yet another possible embodiment of the invention.

FIG. 11 shows a physical layout of one possible configuration 124 of diode 128 and cores 126. In this embodiment, several small cores 126 are connected in series, which improves the mechanical form factor.

Thus, in one possible embodiment of the invention, an array of saturating transformers are connected by diodes to a plurality of battery cells. Each transformer may have a row winding, a column winding, and a sense winding. A particular transformer may then be addressed by alternately applying positive pulses to its row winding and negative pulses to its column winding. Other transformers that share these windings will saturate with a desired magnetic flux direction as they receive pulses of only one polarity. The voltage of the corresponding battery cell can be measured by an analog-to-digital converter connected to the sense-winding common to all the transformers as energy is transferred to that cell through the diode. Operation of battery cell selection requires transformers that once magnetized (saturated) in one direction, hold their magnetization so that the magnetic field in the core changes only a small amount if the magnetization pulse is repeated. Transformer cores with a "square loop" are designed to have this property.

In the above example, when the selected transformer receives a train of positive and negative pulses, the amplitude of the negative pulses is set by the pulse generation circuitry. The amplitude of the positive pulses is limited by the battery voltage and the forward conduction voltage of the diode associated with the cell. There will be an initial transient caused by the leakage inductance associated with the diode and cell connection. The capacitance of the cell and the cell resistance also affect the pulse shape.

Measuring the cell voltage transfers a small amount of charge to the cell. If this is done repeatedly, a quantity of charge will be transferred to the battery. The average current is limited by the positive current pulse amplitude, which is limited by requirements of voltage monitoring. In one embodiment, this level of charge current is thereby automatically limited. Balancing charge may be provided after the main charge provided by a main charger.

Many variations or additions of the present invention are possible. For instance, a current sensor may be utilized to sense the magnetic saturation by measuring the resulting increase in row or column winding current that occurs at saturation and thereby more accurately eliminate or reduce unnecessary pulses and control the required pulse length. Further, the voltage across the row and column windings may be monitored to detect core saturation.

While Vsen presently measures the pulse height, it is also possible to obtain measurements of battery cell charger by measuring other aspects of the voltage pulse such as slope, duration, and the like of the voltage pulse.

Compensation may be provided for diode voltage drops such as MOSFET devices or other devices to eliminate the diode drop on the cell side. Thus, additional circuitry can be provided on the cell side of the transformers.

Multiple turns on the saturating transformers can be used to extend pulses, change voltages, and/or allow higher charge currents.

Soft turn-on of row and column switches can be used to compensate for stray inductance.

Adjustable row and column switch current sources can be used to optimize measurement and balancing.

Parallel/series arrangements of diodes or other elements can be utilized to improve failure tolerance.

Transistors, MOSFET devices, and the like may be utilized in place of diodes.

While a few exemplary embodiments of this invention have been described in detail above, a person skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, any means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A battery system for a plurality of battery cells, said battery system comprising:
    a plurality of transformers electrically coupled to said plurality of battery cells, said plurality of transformers comprising:
        a plurality of saturable magnetic cores, said plurality of saturable magnetic cores being saturable to a first magnetic state comprising a first magnetic flux direction and being saturable to a second magnetic state comprising a second magnetic flux direction, said plurality of saturable magnetic cores being operable for substantially retaining said first magnetic state and said second magnetic state without current flow through said plurality of transformers;
        a plurality of transformer selection windings connected to said plurality of saturable magnetic cores so as to be operable to address a particular transformer from said plurality of transformers through control of said first magnetic state and said second magnetic state for at least one of sensing or balancing a charge state of a particular battery cell or a particular bank of battery cells, said plurality of transformer selection windings comprising:
            a plurality of row windings and a plurality of column windings for said plurality of transformers, wherein a combination of a particular row winding and a particular column winding being operable to address said particular transformer; and
        a plurality of sense windings interconnected to each other in series wherein at least one sense winding is operably associated with each transformer in said plurality of transformers;
    control circuitry connected to said plurality of saturable magnetic cores to supply electric current to selectively place said plurality of saturable magnetic cores in said first magnetic state or said second magnetic state for at least one of sensing or balancing said charge state of said particular battery cell or said particular bank of battery cells;
    a plurality of row switches and a plurality of column switches connected to said plurality of row windings and said plurality of column windings to permit current flow through said particular row winding and said particular column winding for alternately producing said first magnetic state and said second magnetic state in said respective one of said plurality of saturable magnetic cores; and an analog to digital converter operably connected to said plurality of sense windings for measuring said charge state of said particular battery cell or said particular bank of battery cells, wherein said combination of said particular row winding and said articular column winding are electrically connected for alternately producing said first magnetic state and said second magnetic state in a respective one of said plurality of saturable magnetic cores for at least one of sensing or balancing said charge state of said particular battery cell or said particular bank of battery cells.

2. The battery system of claim 1 further comprising control electronics programmed to obtain a measurement of a voltage of said particular battery cell or said particular bank of battery cells from said analog to digital converter while said particular row winding and said particular column winding are alternately producing said first magnetic state and said second magnetic state in said respective one of said saturable magnetic cores.

3. The battery system of claim 1 further comprising a semiconductor connected to said particular battery cell or said particular bank of battery cells transformer to prevent leakage of charge.

4. The battery system of claim 1 further comprising at least one transformer electrically connected to a reference voltage supply to calibrate a detector of said charge state.

5. A method for monitoring a battery system comprising a plurality of transformers connected to a plurality of battery cells, said plurality of transformers being electrically connected in a plurality of groups, said plurality of transformers each comprising a transformer core, said method comprising:

operating a first group switch to set a first group of transformer cores to a first magnetic state;

operating a second group switch to set a second group of transformer cores to a second magnetic state;

operating said first group switch subsequently wherein a particular transformer core of a particular transformer located at an intersection of said first group and said second group of transformer cores changes from said second magnetic state to said first magnetic state; and detecting a voltage of an individual battery cell or bank of battery cells connected to said particular transformer through a sense winding of said particular transformer.

6. The method of claim 5 comprising balancing said individual battery cell or bank of battery cells by repeatedly operating said first group switch and said second group switch.

7. The method of claim 6 comprising repeatedly detecting said voltage of said individual battery cell or bank of battery cells during said step of balancing.

8. The method of claim 5 comprising calibrating a voltage detector utilizing a transformer connected to a precision voltage supply.

9. A method for monitoring battery cells in a battery system comprising a plurality of transformers connected to a plurality of battery cells, said plurality of transformers being electrically connected in a plurality of groups, said plurality of transformers each comprising a transformer core, said method comprising:

operating a first group switch to set a first group of transformer cores to a first magnetic state;

operating a second group switch to set a second group of transformer cores in a to a second magnetic state;

operating said first group switch subsequently wherein only a particular transformer core of a particular transformer located at an intersection of said first group of transformer cores and said second group of transformer cores changes from said second magnetic state to said first magnetic state; and continuing to alternately operate said first group switch and said second group switch whereby charge is added to an individual battery cell or bank of battery cells connected to said particular transformer.

10. The method of claim 9 comprising repeatedly detecting a voltage of said individual battery cell or bank of battery cells while continuing to alternately operate said first group switch and said second group switch.

11. The method of claim 10 comprising detecting said voltage with an analog to digital converter connected to sense windings of plurality of transformers.

\* \* \* \* \*